United States Patent
Citron et al.

(10) Patent No.: US 7,627,600 B2
(45) Date of Patent: Dec. 1, 2009

(54) AUTOMATIC LAYOUT OF UNPREDICTABLE CONTENT FROM MULTIPLE SOURCES

(75) Inventors: David Citron, Redmond, WA (US); Giampiero M. Sierra, Seattle, WA (US); Martin Van Tilburg, Seattle, WA (US); Jeffrey J. Weir, Seattle, WA (US); Orry Soegiono, Seattle, WA (US); Ben Constable, Redmond, WA (US); Colin Anthony, Bothell, WA (US); David Stewart, Seattle, WA (US); David Zearing, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 11/425,300

(22) Filed: Jun. 20, 2006

(65) Prior Publication Data

US 2007/0294238 A1    Dec. 20, 2007

(51) Int. Cl.
  *G06F 17/00*   (2006.01)
(52) U.S. Cl. .................. 707/102; 707/101; 707/103 X; 707/104; 715/204; 715/240; 715/243
(58) Field of Classification Search ........................ None
  See application file for complete search history.

(56) References Cited

U.S. PATENT DOCUMENTS

| | | | | |
|---|---|---|---|---|
| 5,848,184 | A * | 12/1998 | Taylor et al. | 382/173 |
| 6,567,103 | B1 * | 5/2003 | Chaudhry | 715/738 |
| 6,826,594 | B1 | 11/2004 | Pettersen | |
| 7,272,789 | B2 * | 9/2007 | O'Brien | 715/247 |
| 7,277,870 | B2 * | 10/2007 | Mourad et al. | 705/51 |
| 2002/0059345 | A1 * | 5/2002 | Wang et al. | 707/513 |
| 2002/0175935 | A1 * | 11/2002 | Wang et al. | 345/738 |
| 2002/0188635 | A1 * | 12/2002 | Larson | 707/515 |
| 2003/0041110 | A1 * | 2/2003 | Wenocur et al. | 709/206 |
| 2003/0182453 | A1 * | 9/2003 | Kim et al. | 709/246 |

(Continued)

FOREIGN PATENT DOCUMENTS

WO    01/39020 A2    5/2001

OTHER PUBLICATIONS

B. Gatos, et al. "Integrated Algorithms for Newspaper Page Decomposition and Article Tracking," printed Mar. 10, 2006.

(Continued)

*Primary Examiner*—Pierre M Vital
*Assistant Examiner*—Mohammad S Rostami
(74) *Attorney, Agent, or Firm*—Shook, Hardy & Bacon L.L.P.

(57) ABSTRACT

Methods and systems are provided for managing, compiling, and displaying unpredictable digital content received from a plurality of sources, such as news information transmitted in RSS feeds. A layout may be selected from multiple display templates, each having slots for the segments of media that are received. Selection of the templates may be based on the properties of the segments. Further systems and methods are directed to displaying at least a portion of non-textual digital content, such as video and pictures, in a nested view designated for the non-textual graphical content. In one example, the portion of non-textual digital content presented in the nested view is determined by the properties of the non-textual digital content. In other instances, the quantity of the non-textual data may determine what portion is displayed in the nested view.

18 Claims, 4 Drawing Sheets

U.S. PATENT DOCUMENTS

| | | | |
|---|---|---|---|
| 2004/0070600 A1* | 4/2004 | Morrisroe et al. | 345/738 |
| 2004/0078759 A1* | 4/2004 | Ohashi et al. | 715/517 |
| 2004/0083432 A1 | 4/2004 | Kawamura et al. | |
| 2004/0194028 A1* | 9/2004 | O'Brien | 715/517 |
| 2004/0210845 A1* | 10/2004 | Paul et al. | 715/731 |
| 2004/0254859 A1* | 12/2004 | Aslanian, Jr. | 705/27 |
| 2004/0268224 A1* | 12/2004 | Balkus et al. | 715/500.1 |
| 2005/0165615 A1 | 6/2005 | Minar | |
| 2005/0172225 A1* | 8/2005 | Kobashi et al. | 715/517 |
| 2005/0182792 A1* | 8/2005 | Israel et al. | 707/104.1 |
| 2005/0229092 A1* | 10/2005 | Hull et al. | 715/500 |
| 2005/0251742 A1* | 11/2005 | Mogilevsky et al. | 715/521 |
| 2005/0257130 A1* | 11/2005 | Ito | 715/500.1 |
| 2005/0289461 A1* | 12/2005 | Amado et al. | 715/530 |
| 2005/0289468 A1 | 12/2005 | Kahn et al. | |
| 2006/0031758 A1 | 2/2006 | Shur et al. | |
| 2006/0080306 A1* | 4/2006 | Land et al. | 707/3 |
| 2006/0107204 A1* | 5/2006 | Epstein | 715/517 |
| 2007/0209005 A1* | 9/2007 | Shaver et al. | 715/733 |

OTHER PUBLICATIONS

Anil K. Jain, et al. "Document Representation and its Application to Page Decomposition," IEEE Transactions on Pattern Analysis and Machine Intelligence, vol. 20, No. 3, Mar. 1998.

Robert Barta, et al. "Syndication with JML," printed Mar. 10, 2006.

Eric Severson, "XML for Creative Content and Page Layout Applications," XML 2004 Proceedings by ShemaSoft, 2004.

* cited by examiner

205
Sir Ian sorry over Soham, but still believes media is biased

2:29 PM media bias Ian Blair, Britain's most senior policeman, apologised today for suggesting that media coverage of the Soham murde...

215
Iran Says Russia's Nuclear Plan Is N...

1:47 PM

TEHRAN, Jan. 27-Iran's chief nuclear negotiator said today that a Russia...

225
Magnitude 7.7 earthquake strikes Indonesia

12:08 AM

GOLDEN, Colo. A magnitude-7.7 undersea earthquake rocked eastern Indonesia early Saturday, the U.S. Geological Survey said. There was no danger of a tsunami. The eart...

210
U.S. Seeks Eight Tied to Passport Ring

1:52 PM

BOGOTA, Colombia The United States on Friday asked for the...

220
Man and Woman Arrested in Separate Serial Killing Sprees...

2:44 PM

By JULIE WATSON, THE ASSOCIATED PRESS MEXICO CIT...

230
Mexican Agency Cancels Migrant Border Map Pr...

9:45 AM

Mexican government commission says it's suspended plans to distribute border maps to migrants planning to cross into Arizona. The group denies the decision was a response to U-S criticism....

235
Topic of pope's 1st treatise: love

1:05 PM

12:00 AM CST on Thursday, January 26, 2006 Los Angeles Ti...

240
Iran Says Russia's Nuclear Plan Is 'Not Sufficient'

2:31 PM

TEHRAN, Jan. 27- Iran's chief nuclear negotiator said tod...

AUTOMATIC LAYOUT OF UNPREDICTABLE CONTENT FROM MULTIPLE SOURCES

BACKGROUND

Computer users frequently utilize computing devices connected to networks, such as the Internet, to receive local, regional, and even global information. In the example of the Internet, millions of web pages are available as a source of news content. These web pages take many forms, including, for example, articles, blurbs, and web logs ("blogs"), among others. In general, news content is published by inserting it into a web page (e.g., coding it into a HyperText Markup Language (HTML) file), which can then be viewed by any end user having a web browser.

However, there are drawbacks to this approach. Users who wish to see content from a variety of sources must typically visit many different web sites. This is very time consuming, especially if the user is interested in many different types of content and/or sources. In response, "feeds" have been developed as a way to publish news content in a structured format that facilitates identification and analysis. A feed (also known as a "news feed" or "blog feed") can contain articles (content items), meta-data about the articles (e.g., title, date, and author), and/or meta-data about the feed itself (e.g., title, URL, and last-updated timestamp). Some feeds are described by Resource Description Framework (RDF) statements and/or encoded using extensible Markup Language (XML) (such as, e.g., the XML syntax RDF/XML). These features of feeds make it easier for applications to automatically collect and evaluate news content for presentation to the user.

The term "syndication XML" refers to XML that has been developed for feeds, such as Atom and RSS ("Really Simple Syndication," "Rich Site Summary," or "RDF Site Summary"). Since the general structure of a feed is known, it is possible to identify the news content within it. Software applications have been developed that work with content published using syndication XML.

One feature of such applications enables a user to view the content of a feed in a way that is more user-friendly than a raw XML (text) file. (Syndication XML identifies content, without requiring that the content be displayed in any particular way.) Applications and/or application handlers, commonly known as "feed viewers," "feed readers," or "feed aggregators," are capable of reading the syndication XML and presenting it to the user. These applications, which can be implemented as (for example) stand-alone applications or web browser plug-ins, often contain useful user interface controls for facilitating navigation, searching, and the like with respect to news feeds.

While feeds have made it easier to access content, such as news articles, existing techniques for presenting and preserving news feeds have some disadvantages. One problem is that many feeds are merely presented to the user as a "pop-up", wherein a window is presented to a user for a brief period of time and disappears if not selected or otherwise activated by the user. Therefore, users that may be away from the computer device, albeit temporarily, may not see or otherwise be notified of the RSS content. In other techniques, the content of a feed is received and stored for later review by the user. Due to the unpredictable nature of feed content, such as for example, the inclusion of and quantity of pictures, video, and casts, the proper presentation of unpredictable content is limited. One technique, however, allows the user to review the stored content in a column-wise review panel. Further techniques allow unread content to be displayed differently than the read content. While these attempts have their merits, they also suffer from drawbacks. For example, arranging the feed content is a column-like format is not aesthetically pleasing to the user and upon updating the content, the ordering of the content may change, thus further confusing the reader. This is further complicated by attempting to arrange different media content in a standard format.

SUMMARY

Methods and systems are provided for managing, compiling, and displaying content received from different sources. In one example, an automatic rich layout of unpredictable digital content from several sources is generated. The digital content may be media streams in one or more formats. The sources may comprise news source, such as transmitted by an RSS feed. In one example the layout is selected from multiple display templates, each having slots for the segments of media that are received. The selection of the templates may be based on the properties of the segments, which may include, for example, the amount of space required to display at least a portion of the media segment, source of the media content, relevancy of the content, time of the digital content's creation, quantity of digital content, quantity of specific media type within the media content, quality of media content, and combinations thereof.

Further aspects are directed to displaying at least a portion of non-textual digital content, such as video and pictures, in a nested view designated for the non-textual graphical content. In one example, the portion of non-textual digital content presented in the nested view is determined by the properties of the non-textual digital content. For example, it may be desirable to display only the highest quality picture or video for each segment. In other situations, the quantity of the non-textual data may determine what portion is displayed in the nested view. Other factors may determine how the non-textual data is displayed in the nested view.

These and other advantages will become apparent from the following detailed description when taken in conjunction with the drawings. A more complete understanding of the present invention and the advantages thereof may be acquired by referring to the following description in consideration of the accompanying drawings, in which like reference numbers indicate like features. The invention is being described in terms of exemplary embodiments. Numerous other embodiments, modifications and variations within the scope and spirit of the appended claims will occur to persons of ordinary skill in the art from a review of this disclosure.

DETAILED DESCRIPTION

Description of Illustrative Embodiments

Figure 1:
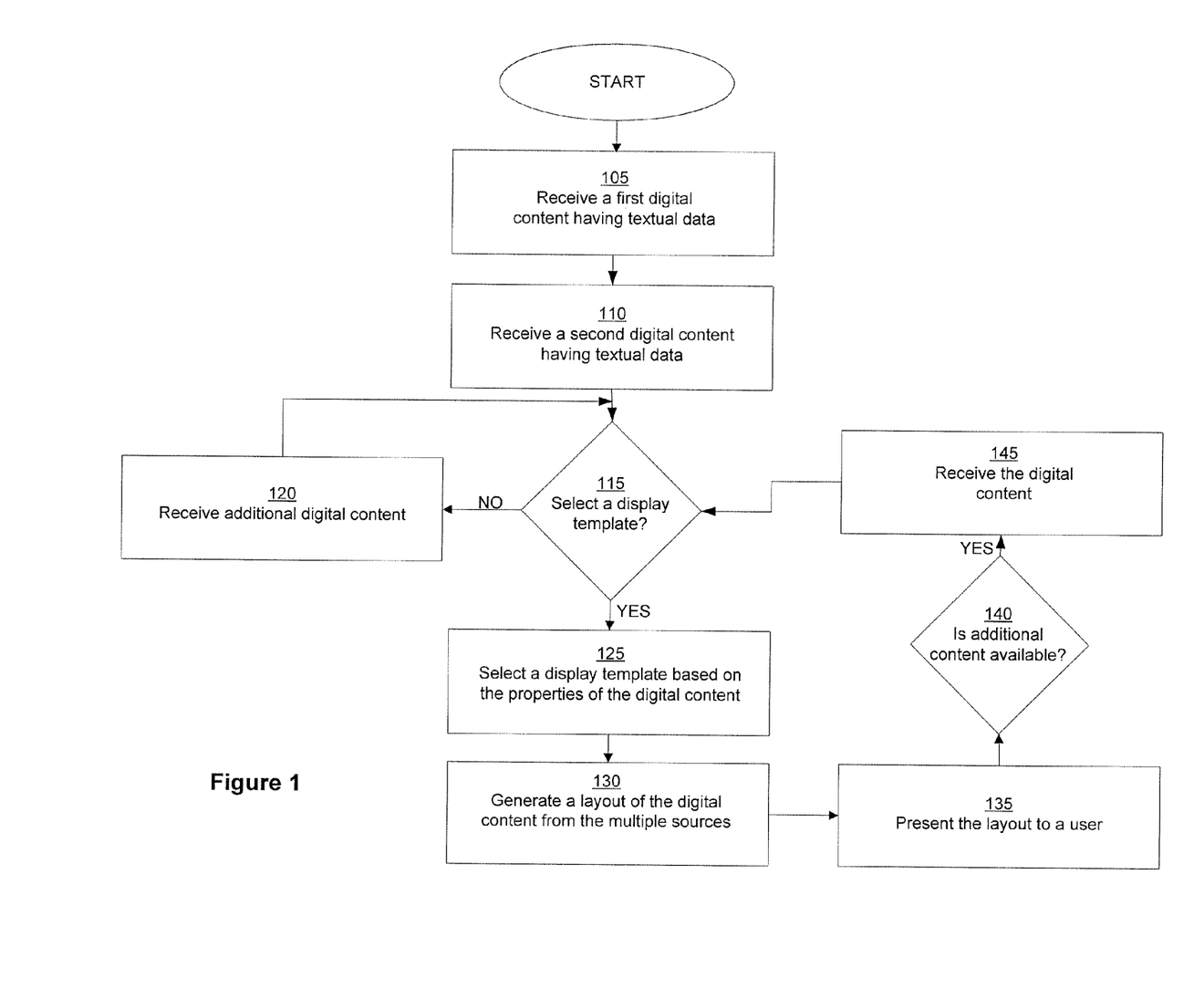
FIG. 1 is a flow diagram of an exemplary method of generating an automatic layout of unpredictable digital content from a plurality of sources.

FIG. 1 is a flow diagram of an exemplary method of generating an automatic layout of unpredictable digital content from a plurality of sources. The digital content is unpredictable in that several attributes may be highly variable among different segments of digital content. For example, the electronic format of digital information may vary among different segments received, such as HTML, XML, etc. Further, one segment may comprise a plurality of low-resolution graphical representations, whereas another comprises single high resolution video content.

In exemplary step 105, a first digital content having textual data is received from a first source. In addition to having the textual data, the digital content may also include any other electronic data capable of being transmitted to a computing device, including for example, pictures, videos, casts, and the like. The first source may be a news gathering agency, a webpage, a broadcast, pod cast, or any source configured to distribute electronic content. In one embodiment, the first source is a news feed from MSNBC®. In one such embodiment, the news feed is distributed in the RSS format. In step 110, a second transmission of digital content is received from at least one additional source. The source(s) may also be any source configured to distribute electronic content as described in relation to step 105. As used in conjunction to describing steps 105 and 110, the term "receiving" is used to indicate the digital content is received at a computer-readable medium. The computer-readable medium may a component of a server, a plurality of servers, a disk array, personal computing devices, such as a desktop or laptop, for example, running Microsoft® Windows® operating system, a hand-held device, a tablet, a cellular device, and/or a media component, such as the Microsoft® Xbox®. Indeed, any computing device having a computer-readable medium is contemplated to be within the scope of the described embodiments, for example, the exemplary computing device 400 shown in FIG. 4 having processing unit 402 and memory 404 may be used in one or more steps of the exemplary method. Computing device 400 is described in more detail in later in the Specification.

As one skilled in the art will readily understand, the terms "first digital content" and "second digital content" are used to more clearly indicate to the reader that digital content is received from a plurality of sources, and is in no way meant to limit the embodiments to only two sources. As described above, the digital content received from either the first source and/or the second source may comprise a plurality of segments. For example, in the embodiment where the source is a news feed from MSNBC®, each segment may be an individual news article or portion thereof.

In step 115, it is determined whether a display template is to be selected based on the properties of the first digital content and the second digital content. The determination to select a template may be made upon the passing of a fixed period of time, receiving a fixed amount of content or segments of content, or other variable or combinations thereof. In one embodiment where at least one of either the first digital content or the second digital content comprises an RSS feed, the total amount of segments that are received in a fixed period of time are quantified and considered when selecting a display template. If, at step 115, it is determined that a display template is not to be selected, step 120 may be implemented. At exemplary step 120, additional media is received. The additional media may be from the first source, the second source, or another source of electronic media. As one skilled in the art will readily understand, step 120 may comprise another step, depending on the criteria utilized for determining when a display template is chosen. Furthermore, fewer or additional steps may be used without departing from the scope of the disclosure.

At exemplary step 125, a display template is selected. A large variety of properties of the digital content may be utilized to select a display template. In one embodiment, the amount of space required to display at least a portion of the media segment is considered. In another embodiment, the amount of segments received may be utilized to determine which template is selected. For example, if three segments were collectively received from the sources a different template may be selected than if four segments were received from the collective sources.

Yet in other embodiments, there may be a plurality of templates that may be selected for the situation where a fixed number of segments are received. In one such embodiment, one or more secondary criteria may be implemented to determine which display template is chosen. In yet other embodiments, the number of segments received may be a secondary criterion, while another criteria is the primary criteria for determining which display template is selected. Other properties of the digital content that may be utilized as a primary and/or secondary criterion may include the source of the media content. For example, the user may have indicated, whether expressly or impliedly, that a source of digital content is more interesting or reliable, therefore, a template may be chosen that reserves more space to that corresponding content. In other embodiment, the relevancy of the content may be one property that may be considered. In yet another embodiment, the time of the digital content's creation or reception may be a factor.

More specific properties may also be utilized when selecting a template. For example, the quantity of one or more specific media types within the media content may be considered. In one such embodiment, a display template that has a more appropriate layout for that embodiment may be chosen. For example, if a RSS feed having a video is received from a news feed source, a specific template may be chosen. Other properties may also be considered, either in conjunction with or independent of, the media types present. For example, the quality of the video may be considered. In one such embodiment, a template having a smaller video display and consequently possibly more segments may be selected.

In step 130, a layout of the first and second digital content (possibly with additional content that may have been added at step 120 or another step) is generated. The layout may be generated on a server, for example, before being transmitted to an end user. This may be advantageous, for example, for allowing users to access the same content or update the content from multiple sources among other advantages. In yet other embodiments the layout may be generated at an end user computing device. This may be advantageous, for example, for allowing users to quickly recall and display the same content among other advantages. As readily understood, any computing device having a processor and a computer-readable medium may generate the layout. In step 135, the layout is presented to a user through a display device. If the layout is generated remotely from the computing device where it is presented to the user, the layout may be transferred by any electronic means, for example, through a local area network (LAN) or wide area network (WAN).

Once the layout comprising the first and the second digital content (as well as any additional content added in step 120) has been generated, it is preserved when new content is received. For example, in the illustrated embodiment, step 140 determines if additional content is available. If additional content is available, then step 145 may be implemented, where the digital content is received. In one embodiment, the reception of the digital content mirrors steps 105 and 110. Once the content is received, step 115 may be initiated as discussed above to determine if a display template is to be selected.

Once a display template is selected, a second layout comprising the additional content received in step 145 is generated. The first generated layout comprising the digital content from steps 105 and 110 remains preserved. This allows a user to view all the digital content at a later time in the same presentation format and arrangement. In this regard, one embodiment of the invention may resemble a digital newspaper where new pages may be amended to the collection without altering or otherwise arranging the previous content. Of course, older content may be deleted, archived, or otherwise changed at the discretion of the user or subject to automatic functions; however, in certain embodiments the change of the older content will not be changed to utilize a different display template due to additional content being received.

Figure 2A:
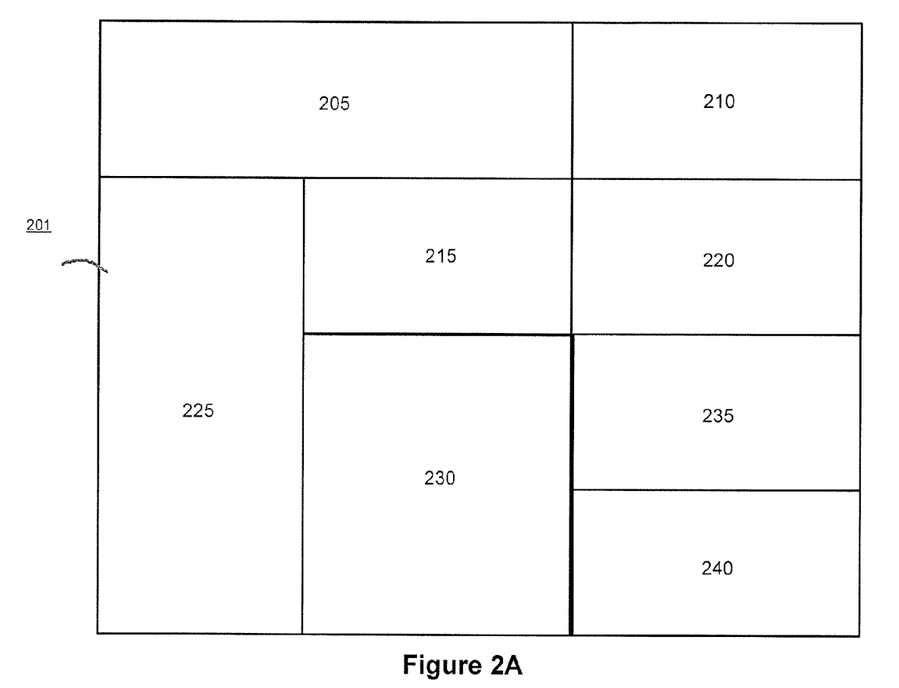
FIG. 2 shows illustrative display template configurations according to one embodiment of the invention.
Figure 2B:
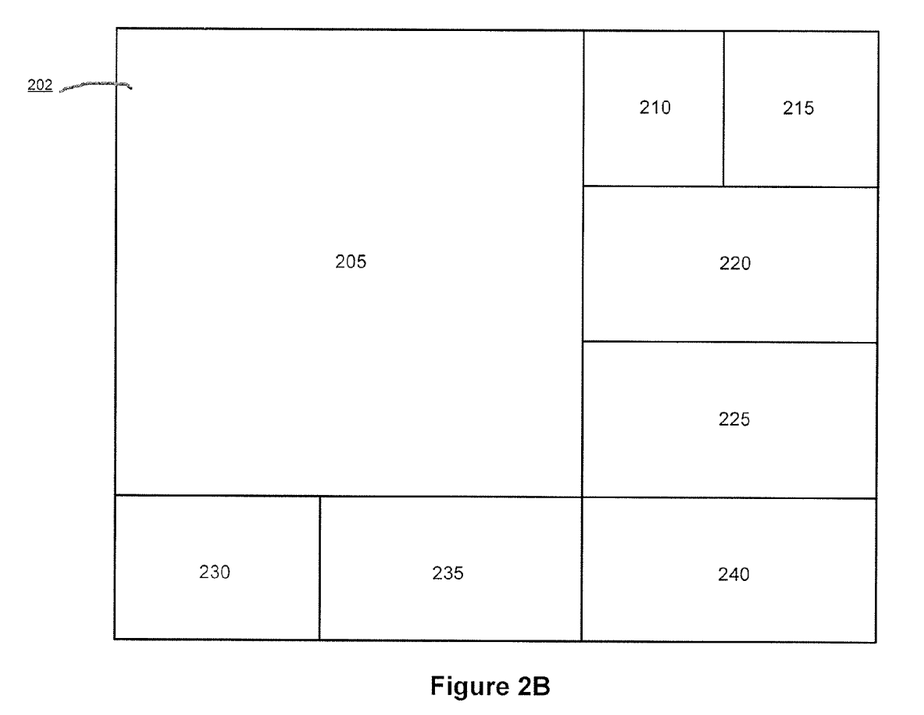

FIG. 2 shows illustrative display template configurations according to one embodiment of the invention. Both the display template 201 shown in FIG. 2A and the display template 202 shown in FIG. 2B have 8 "slots" (slots 205-240) or locations for placing a media segment having textual data, however, have different display parameter. In one embodiment where 8 segments are received from at least two sources, these two templates may be available for use. Selection of either these two templates may be based on any factor discussed above or others. For example, in one embodiment, display template 201 is chosen since many of the media segments received comprise similar media types or have similar relevance.

However, in another embodiment, display template 202 is selected because one media segment received was marked or otherwise flagged to indicate a high relevancy or urgency. In one such embodiment, the media segment is placed in slot 205, which is much larger than the other slots, therefore likely to get the reader's attention. In yet another embodiment, one segment has a high quality video, whereas the other segments may either have a lower quality video or pictures. Therefore, in such an embodiment, the segment having the higher quality video may be placed in slot 205 as shown in FIG. 2B, which is substantially larger than the other slots.

Figure 3:
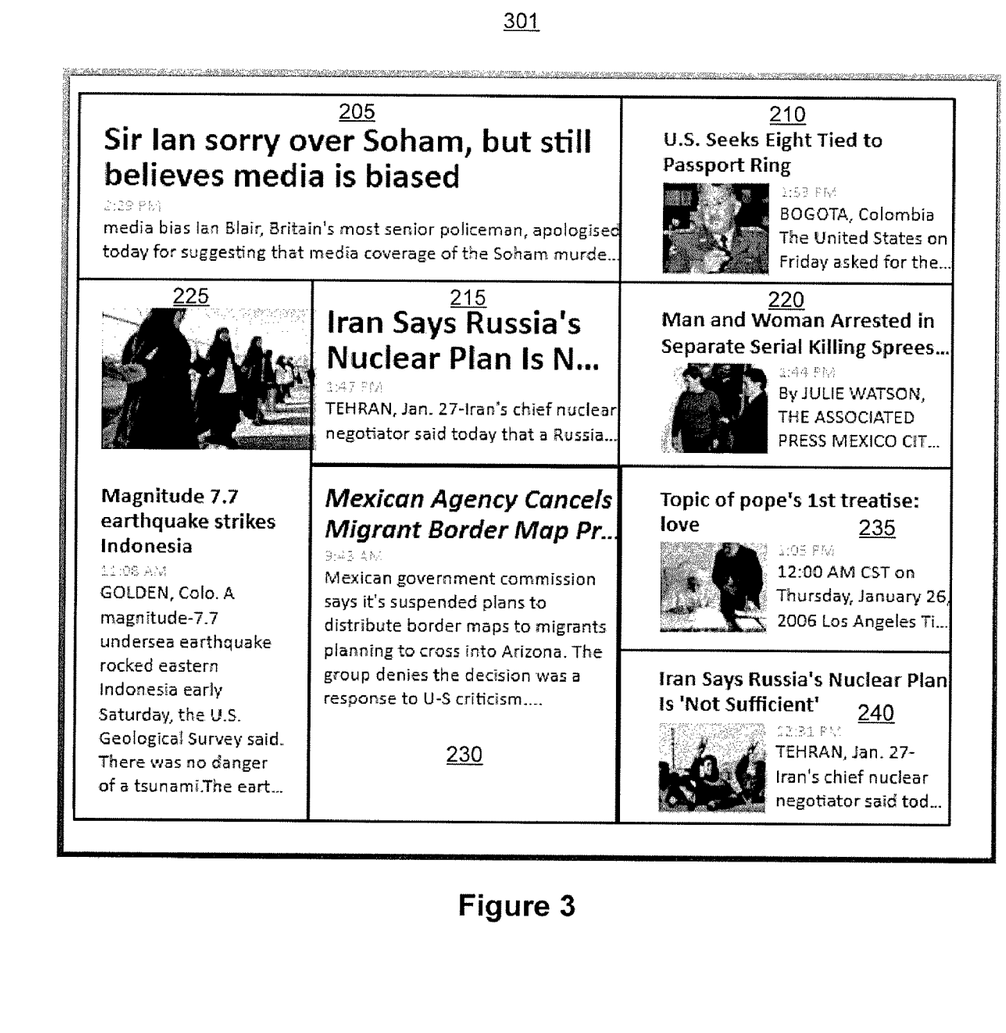
FIG. 3 shows an illustrative screenshot of one embodiment utilizing the template shown in FIG. 2A.

FIG. 3 shows an illustrative screenshot of exemplary layout 301 utilizing the template shown in FIG. 2A. As seen in FIG. 3, each of the slots of the display template shown in FIG. 2A (205-240) has been filled with a media segment. As seen, slots 205, 215, 230 comprise textual data only. Slots 210, 220, 235, and 240 also have graphical representations, such as photographs, and slot 225 comprises a video. The illustrative arrangement provides a more aesthetic view of the segments received from multiple news feeds than previously allowed. As discussed before, one the template is created, it is preserved, despite receiving additional information, such as in step 145.

As shown in FIG. 3, each segment associated with a graphical representation (slots 205-240) only has a single photograph. This is merely for illustrative purposes only, and other embodiments may have more photographs or pictures within the same segment. Likewise, a single slot may comprise a mixture of media formats, for example, it may comprise a plurality of photographs, and a video. However, in some instances, despite a media segment being associated with a plurality of media formats, it may be desirable to preserver space. Further aspects are directed to displaying at least a portion of the non-textual digital content in a nested view designated for the non-textual graphical content. In one embodiment, the portion of non-textual digital content presented in the nested view is determined by the properties of the non-textual digital content. For example, it may be desirable to display only the highest quality picture or video for each segment. In other embodiment, the quantity of the non-textual data may determine what portion is displayed in the nested view.

Yet in another embodiment, the format of the non-textual data may determine what portion is displayed. This may especially advantageous where a user is limited in the available bandwidth, such as using a dial-up connection to access the news feeds. Of course, a combination of all these exemplary properties along with any property of the non-textual data may be utilized for determining what portion is displayed in the nested view. In still yet a further embodiment, a portion of non-textual data is presented in the nested view for a fixed period of time, wherein at least a second portion of the non-textual digital content is presented in the nested view designated for the non-textual graphical content for a second period of time. This allows the reader to view more non-textual data in the same limited amount of space. In one such embodiment, a slide show may be used to display multiple pictures in the nested view. In other embodiment, a album may be presented to the user to scroll through. In still yet another embodiment, thumbnails may be incorporated into the nested view. Indeed, one skilled in the art will understand there are a plurality of methods to incorporate this aspect into the scope of the disclosure.

Simplified Computing Device Description

Figure 4:
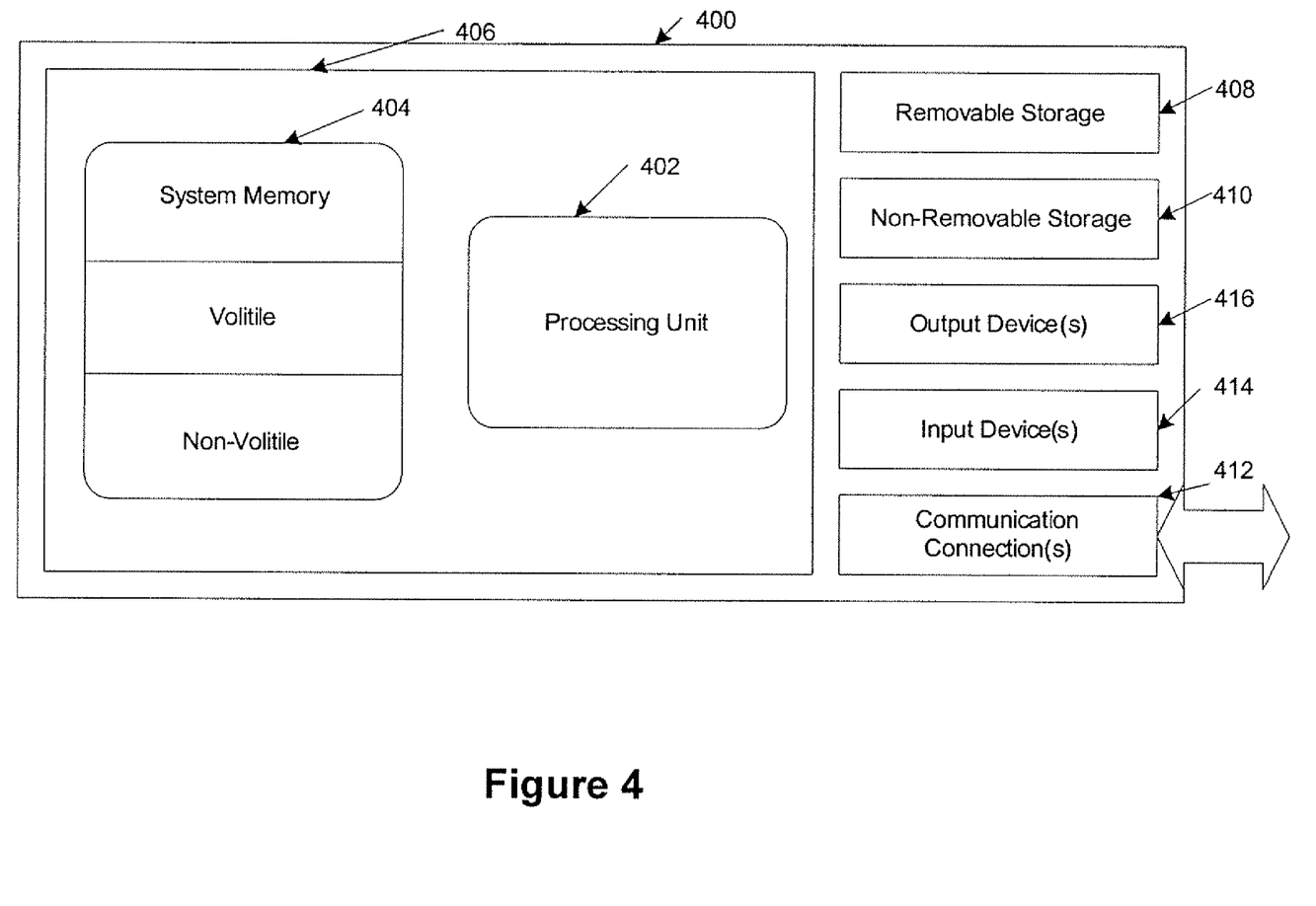

With reference to FIG. 4, an exemplary system for implementing select embodiments or portions of select embodiments includes a computing device, such as computing device 400. In its most basic configuration, computing device 400 typically includes at least one processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, device 400 may also have additional features/functionality. For example, device 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Device 400 may also contain communications connection(s) 412 that allow the device to communicate with other devices. Communications connection(s) 412 is an example of communication media. Communication media typically embodies computer readable instructions, data structures, and program modules. The term computer readable media as used herein includes both storage media and communication media.

Device 400 may also have input device(s) 414 such as keyboard, mouse, pen, voice input device, touch input device, etc. Output device(s) 416 such as a display, speakers, printer, etc. may also be included. All these devices are well know in the art and need not be discussed at length here.

The present invention has been described in terms of exemplary embodiments. Numerous other embodiments, modifications and variations within the scope and spirit of the appended claims will occur to persons of ordinary skill in the art from a review of this disclosure. For example, one skilled in the art will appreciate different methods may be used to conduct the comparative search queries without departing from the scope of the invention. Moreover, one or more steps of the described methods may be omitted or duplicated, and in some instance performed in a different sequence than described above.

We claim:

1. One or more computer-readable storage mediums having computer-executable instructions for performing the method of generating an automatic layout of unpredictable digital content from a plurality of sources comprising the steps of:
   receiving a first digital content having non-textual data from a first source;
   receiving a second digital content having non-textual data from a second source;
   determining whether a display template is selected, wherein said determining comprises at least one of determining whether a fixed period of time has passed and determining whether a fixed amount of content has been received, wherein if a display template is not selected, the method further comprises receiving additional content;
   if a display template is selected, selecting a display template based on properties of the first digital content and the second digital content;
   generating a layout of the first and second digital content in the template selected, wherein at least a first portion of the non-textual data is presented in a nested view designated for non-textual graphical content for a first period of time, and at least a second portion of the non-textual data is presented in the nested view designated for the non-textual graphical content for a second period of time; and wherein the portion of non-textual data presented in the nested view is determined by quality of the non-textual data; and
   wherein once the layout of the first and second digital content is generated, the layout is preserved, despite receiving additional content; and
   wherein after a layout has been generated, the method further comprises the steps of:
   receiving additional digital content; and
   selecting a second display template based on properties of the additional digital content; and
   generating a layout of the additional content in the second display template selected, wherein the layout comprising the first and second digital content is preserved.

2. The computer-readable storage medium of claim 1, wherein the properties of the first and second digital content that are used to select a display template comprises the quantity of digital information.

3. The computer-readable storage medium of claim 2, wherein at least one of the first or second digital content comprises individual media segments and the quantity of digital information is quantified by the number of media segments.

4. The computer-readable storage medium of claim 3, wherein a plurality of templates meet the criteria for selection and a second criteria is utilized for selecting a template.

5. The computer-readable storage medium of claim 1, wherein the properties of the first and second digital content that are used to select a display template comprise the properties selected from the group consisting of: the amount of space required to display at least a portion of the media segment, source of the media content, relevancy of the content, time of the digital content's creation, quantity of digital content, quantity of specific media type within the media content, quality of media content, and combinations thereof.

6. The computer-readable storage medium of claim 1, wherein at least a portion of the digital content is received from a news feed in a browser.

7. A method of generating an automatic layout of arbitrary content having a nested view comprising the steps of:
   employing a processor coupled to a memory to execute the generation of the automatic layout of arbitrary content having a nested view, comprising:
   receiving first digital content from a first source; receiving second digital content from a second source;
   determining that at least one of the first and the second digital content comprises non-textual digital content;
   determining whether a display template is selected, wherein said determining comprises at least one of determining whether a fixed period of time has passed and determining whether a fixed amount of content has been received, wherein if a display template is not selected, the method further comprises receiving additional content;
   if a display template is selected, selecting a display template based on properties of the first digital content and the second digital content;
   generating a layout of the first and second digital content in the template selected, wherein at least a first portion of the non-textual digital content is present in a nested view designated for non-textual graphical content for a first period of time, and at least a second portion of the non-textual digital content is presented in the nested view designated for the non-textual graphical content for a second period of time; and wherein the portion of non-textual digital content presented in the nested view is determined by quantity of the non-textual digital content which is quantified by the number of media segments comprising the non-textual digital content; and
   wherein after a layout has been generated, the method further comprises the steps of:
   receiving additional digital content; and
   selecting a second display template based on properties of the additional digital content; and
   generating a layout of the additional content in the second display template selected, wherein the layout comprising the first and second digital content is preserved.

8. The method of claim 7, wherein the properties of the first and second digital content that are used to select a display template comprises the quantity of digital information and at least one of the first or second digital content comprises individual media segments and the quantity of digital information is quantified by the number of media segments.

9. The method of claim 7, wherein the properties of the first and second digital content that are used to select a display template comprise the properties selected from the group consisting of: the amount of space required to display at least a portion of the media segment, source of the media content, relevancy of the content, time of the digital content's creation, quantity of digital content, quantity of specific media type within the media content, quality of media content, and combinations thereof 10. The method of claim 7, wherein at least a portion of the digital content is received from a news feed.

11. A method for generating automatic layouts of arbitrary unpredictable digital content from a plurality of sources comprising the steps of:
    employing a processor coupled to a memory to execute the generation of the automatic layout of arbitrary unpredictable digital content from a plurality of sources, comprising:
    receiving a first transmission of a plurality of digital content segments, the first transmission comprising a Really Simple Syndication (RSS) feed, wherein at least one of the plurality of digital content segments comprises a video;
    determining whether to select a display template by determining whether a fixed number of digital content segments has been received during a fixed period of time, wherein upon determining not to select a display template, the method further includes receiving a second plurality of digital content segments;
    selecting a display template based on properties of the digital content segments received;
    generating a second layout of the digital content in the template selected, wherein at least a first portion of non-textual digital content is presented in a nested view designated for the non-textual graphical content;
    receiving at least a third transmission of a plurality of digital content segment;
    selecting a second display template based on properties of the digital content segments received in the third transmission; and
    generating a second layout of the digital content received in the third transmission in the second template selected, wherein the arrangement of the first layout remains substantially unaltered for a first period of time, and at least a second portion of the non-textual digital content is presented in the nested view designated for the non-textual graphical content for a second period of time; and wherein the portion of non-textual digital content presented in the nested view is determined by properties of the non-textual digital content.

12. The method of claim 11, wherein the second layout is displayed to a user in a substantially close proximity to the first layout.

13. The method of claim 11, wherein the properties of the second digital content that are used to select a display template comprise the properties selected from the group consisting of: the amount of space required to display at least a portion of the media segment, source of the media content, relevancy of the content, time of the digital content's creation, quantity of the digital content, quantity of the specific media type within the media content, quality of media content, and combinations thereof.

14. The computer-readable storage medium of claim 1, wherein the first digital content includes textual data and non-textual data from a first source and the second digital content includes textual data and non-textual data from a second source.

15. The computer-readable storage medium of claim 1, further comprising: presenting the layout to a user through a display device.

16. The method of claim 11, wherein the first transmission of a plurality of digital content segments includes textual data from a plurality of sources.

17. The method of claim 16, wherein the second plurality of digital content segments includes textual data.

18. The method of claim 17, wherein the third transmission of a plurality of digital content segments includes textual data.

* * * * *

UNITED STATES PATENT AND TRADEMARK OFFICE
CERTIFICATE OF CORRECTION

| | | |
|---|---|---|
| PATENT NO. | : 7,627,600 B2 | Page 1 of 1 |
| APPLICATION NO. | : 11/425300 | |
| DATED | : December 1, 2009 | |
| INVENTOR(S) | : David Citron et al. | |

It is certified that error appears in the above-identified patent and that said Letters Patent is hereby corrected as shown below:

In column 8, line 67, in Claim 9, after "thereof" insert -- . --.

Signed and Sealed this
Twenty-fifth Day of January, 2011

David J. Kappos
*Director of the United States Patent and Trademark Office*